(12) United States Patent
Wang

(10) Patent No.: US 10,166,722 B2
(45) Date of Patent: Jan. 1, 2019

(54) METHOD FOR MAKING A COATED FABRIC

(71) Applicant: Fabricoat Industrial Corp., Nantou (TW)

(72) Inventor: Hung-Jung Wang, Nantou (TW)

(73) Assignee: FABRICOAT INDUSTRIAL CORP., Nantou, Nantou (TW)

( * ) Notice: Subject to any disclaimer, the term of this patent is extended or adjusted under 35 U.S.C. 154(b) by 324 days.

(21) Appl. No.: 15/083,104

(22) Filed: Mar. 28, 2016

(65) Prior Publication Data

US 2017/0274579 A1  Sep. 28, 2017

(51) Int. Cl.
*B32B 27/12* (2006.01)
*B32B 27/32* (2006.01)
*B32B 27/40* (2006.01)
*B32B 37/24* (2006.01)
*B32B 37/26* (2006.01)
*B32B 38/16* (2006.01)
*D06N 3/04* (2006.01)
(Continued)

(52) U.S. Cl.
CPC ............ *B29C 65/524* (2013.01); *B29C 41/00* (2013.01); *B32B 27/12* (2013.01); *B32B 27/32* (2013.01); *B32B 27/322* (2013.01); *B32B 27/40* (2013.01); *B32B 37/02* (2013.01); *B32B 37/24* (2013.01); *D06N 3/0006* (2013.01); *D06N 3/0009* (2013.01); *D06N 3/0097* (2013.01); *D06N 3/045* (2013.01); *D06N 3/047* (2013.01); *D06N 3/14* (2013.01); *B29K 2023/06* (2013.01); *B29K 2027/18* (2013.01); *B29K 2075/00* (2013.01); *B29K 2275/00* (2013.01); *B32B 2037/243* (2013.01); *B32B 2037/268* (2013.01); *B32B 2038/166* (2013.01); *B32B 2038/168* (2013.01)

(58) Field of Classification Search
CPC ............ B29K 2023/06; B29K 2027/18; B29K 2075/00; B32B 27/12; B32B 27/32; B32B 27/322; B32B 27/40; B32B 37/15; B32B 37/24; B32B 2037/243; B32B 2037/268; B32B 38/164; B32B 2038/166; B32B 2038/168; C08J 9/28; C08J 2201/0542; C08J 2201/0544; D06N 3/0006; D06N 3/0009; D06N 3/0011; D06N 3/0095; D06N 3/0097; D06N 3/045; D06N 3/047; D06N 3/14
See application file for complete search history.

(56) References Cited

U.S. PATENT DOCUMENTS 3,657,034 A * 4/1972 Fukushima .......... D06N 3/0004
156/230
3,843,436 A * 10/1974 Yanagida ............. D06N 3/0095
156/148

(Continued)

*Primary Examiner* — Michael A Tolin
(74) *Attorney, Agent, or Firm* — DLA Piper LLP (US)

(57) ABSTRACT

A method for making a coated fabric includes the steps of: applying a coating solution of a resin in an organic solvent to a roller-conveyed non-stretchable and releasable substrate web to form a coating layer; laminating a roller-conveyed base fabric to the coating layer to form a laminate; guiding the laminate to pass through at least one tank containing water to immerse the laminate in water such that the coating layer is solidified and the organic solvent contained in the coating layer is replaced by water; and removing water from the coating layer by drying to leave micropores in the coating layer.

11 Claims, 13 Drawing Sheets

(51) Int. Cl.
*D06N 3/14* (2006.01)
*B29C 65/52* (2006.01)
*D06N 3/00* (2006.01)
*B29C 41/00* (2006.01)
*B32B 37/02* (2006.01)
*B29K 27/18* (2006.01)
*B29K 275/00* (2006.01)
*B29K 75/00* (2006.01)

(56) References Cited

U.S. PATENT DOCUMENTS

| | | | | |
|---|---|---|---|---|
| 4,598,662 A | * | 7/1986 | Chen | D06B 3/04 118/118 |
| 5,692,936 A | * | 12/1997 | Yamaguchi | D06M 15/568 156/230 |
| 2016/0017527 A1 | | 1/2016 | Lin | |

* cited by examiner

METHOD FOR MAKING A COATED FABRIC

FIELD

The disclosure relates to a method for making a coated fabric, and more particularly to a method for making a coated fabric that has functions such as water-proof and breathable functions.

BACKGROUND

Fabrics 9 are generally made from fibers, and are roughly classified into a woven fabric 91 (see FIG. 1) and a knitted fabric 92 (see FIG. 2). The woven fabric 91 is made by the interlacement of warp threads 911 running parallel lengthwise and weft threads 912 running parallel crosswise. The knitted fabric 92 is made by creating consecutive rows of interlocking loops 920 of thread 921 using needles, thereby making the knitted fabric. The knitted fabric 92 is more stretchable and loose than the woven fabric 91.

A coating material may be applied to the fabric 9 to form a coating layer on the fabric 9. The coating layer may be subjected to wet-solidification or dry-solidification to provide the fabric 9 with a functional layer having water-proof and breathable functions.

With reference to FIG. 3, since the woven fabric 92 is relatively tight and less stretchable, it may be coated with a coating material 3 using a roller coating machine 8 in which the woven fabric 91 is conveyed by rollers 81 so that a uniform coating layer 31 can be formed on the woven fabric 91. However, if the coating material 3 is applied to the knitted fabric 92 using the roller coating machine 8, since the knitted fabric 92 is more stretchable than to the woven fabric 91, as mentioned above, it will be stretched by the rollers 81 so that the coating layer 31 which is applied to the knitted fabric 92 in a uniform manner becomes deformed and is uneven in thickness when the stretched knitted fabric 92 is removed from the rollers 81 and returns to its normal state (i.e., an unstretched state). In addition, the knitted fabric 92 may sag under the weight of the coating material 3 since the knitted fabric 92 has a relatively loose structure, thereby causing the coating layer 31 formed thereon to be uneven. Alternatively, when the coating material 3 is applied to the knitted fabric 92 manually using a doctor blade, the knitted fabric 92 may deform due to stretching caused by the doctor blade in contact therewith, which may also make the coating layer 31 uneven.

With reference to FIG. 4, to overcome the aforesaid problems, there has been developed a method for applying a coating layer to the knitted fabric 92, in which a coating material 41 is applied evenly to a releasing paper 6, followed by dry-solidifying to form a uniform solid coating layer 42 on the releasing paper 6. A binder 5 is applied to the knitted fabric 92 to form a binder layer 51, followed by bonding the uniform solid coating layer 42 together with the releasing paper 6 to the binder layer 51 on the knitted fabric 92. The knitted fabric 92 provided with the uniform solid coating layer 42 as a functional layer is obtained by removing the releasing paper 6 from the uniform solid coating layer 42 after the binder layer 51 is solidified.

Although the knitted fabric 92 can be provided with the uniform solid coating layer 42 using the aforesaid method, the binder 51 sandwiched therebetween may negatively affect the function such as water-proof and breathable functions, of the uniform solid coating layer 42 imparted to the knitted fabric 92. In addition, since the releasing paper 6 has a low structural strength, it is liable to breaking under high tension during the application of the coating material 41 to the releasing paper 6 conveyed by the rollers 81 of the roller coating machine 8. Furthermore, as the structural integrity of the releasing paper 6 may be negatively affected after absorption of water, the wet-solidifying process is not suitable for solidifying the coating material 41 applied on the releasing paper 6 to form the uniform solid coating layer 42.

In a co-pending application of the present assignee, Ser. No. 14/332188 (Publication No. US20160017527), filed Jul. 15, 2014, a method for coating a knitted fabric is disclosed. The method includes the following steps of: attaching a knitted fabric flatly onto a carrier sheet to form a laminate, the carrier sheet having a tensile strength greater than that of the knitted fabric; forming a coating layer onto a top surface of the knitted fabric; and separating the knitted fabric with the coating layer from the carrier sheet.

SUMMARY

An object of the disclosure is to provide a method for making a coated fabric to overcome the aforesaid problems of the prior art.

According to the disclosure, there is provided a method for making a coated fabric, which includes the steps of:

applying a coating solution of a resin in an organic solvent on a roller-conveyed non-stretchable and releasable substrate web at a coating station of a running route to form a coating layer on the roller-conveyed non-stretchable and releasable substrate web;

laminating a roller-conveyed base fabric to the coating layer on the roller-conveyed non-stretchable and releasable substrate web at a laminating station downstream of the coating station to form a laminate, in which the roller-conveyed base fabric overlies the coating layer on the roller-conveyed non-stretchable and releasable substrate web;

guiding the laminate along the running route to pass through at least one tank containing water at an immersing station downstream of the laminating station to immerse the laminate in water such that the coating layer is solidified and the organic solvent contained in the coating layer is replaced by water; and guiding the laminate coming out of the tank to a drying station downstream of the immersing station to remove water from the coating layer by drying so as to leave micropores in the coating layer.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 5:
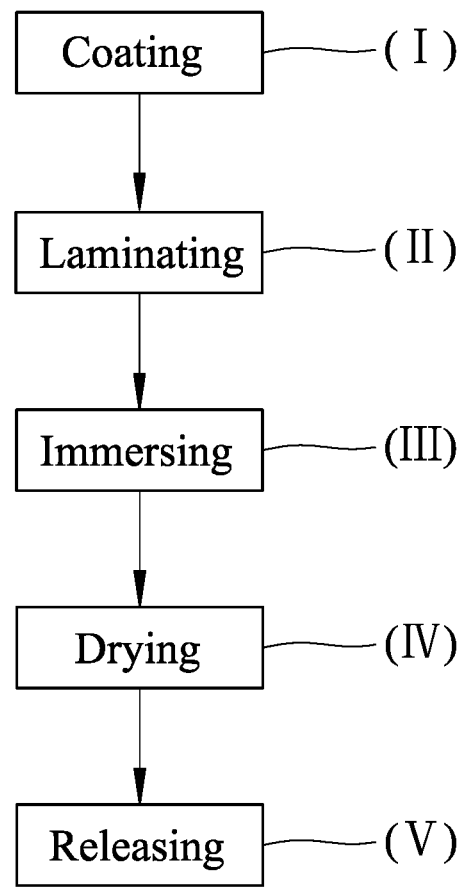
FIG. 5 is a flow diagram of an embodiment of a method for making a coated fabric according to the disclosure.

With reference to FIG. 5, a method for making a coated fabric according to the disclosure includes the steps of coating, laminating, immersing, drying, and releasing, which are described in detail as follows.

Figure 6:
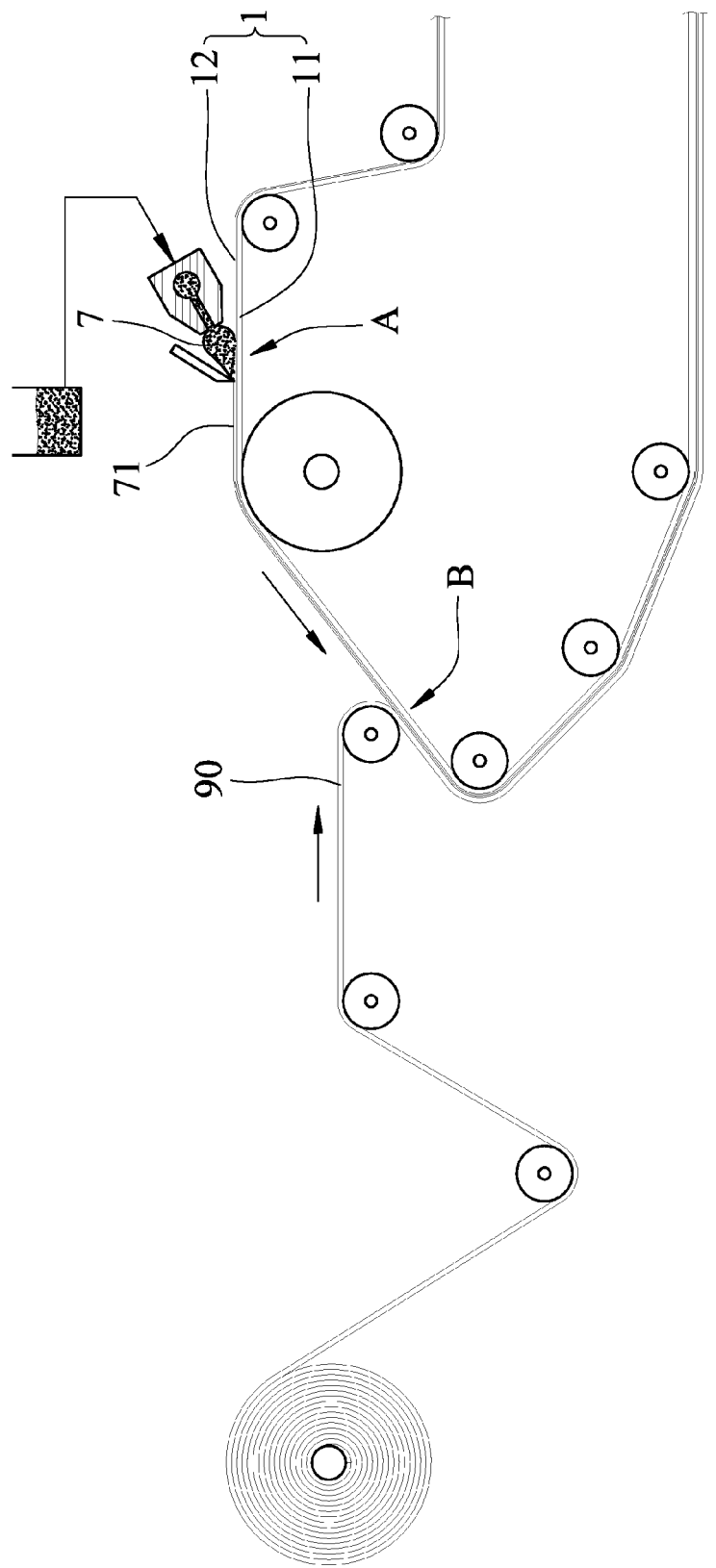
FIGS. 6, 7, 8, and 9 are schematic views cooperatively illustrating the embodiment of the method for making a coated fabric according to the disclosure.

(I) Coating:

With reference to FIG. 6, a coating solution 7 of a resin in an organic solvent is applied to a roller-conveyed non-stretchable and releasable substrate web 1 at a coating station (A) of a running route to form a coating layer 71 on the roller-conveyed non-stretchable and releasable substrate web 1. The non-stretchable and releasable substrate web 1 is conveyed by rollers of a conveying device (not shown). The application of the coating solution 7 to the roller-conveyed non-stretchable and releasable substrate web 1 may be performed by, for example, a doctor blade coating method. The resin contained in the coating solution is selected from the group consisting of a polytetrafluoroethylene resin, a polyethylene resin, a polyurethane resin, and combinations thereof.

Figure 10:
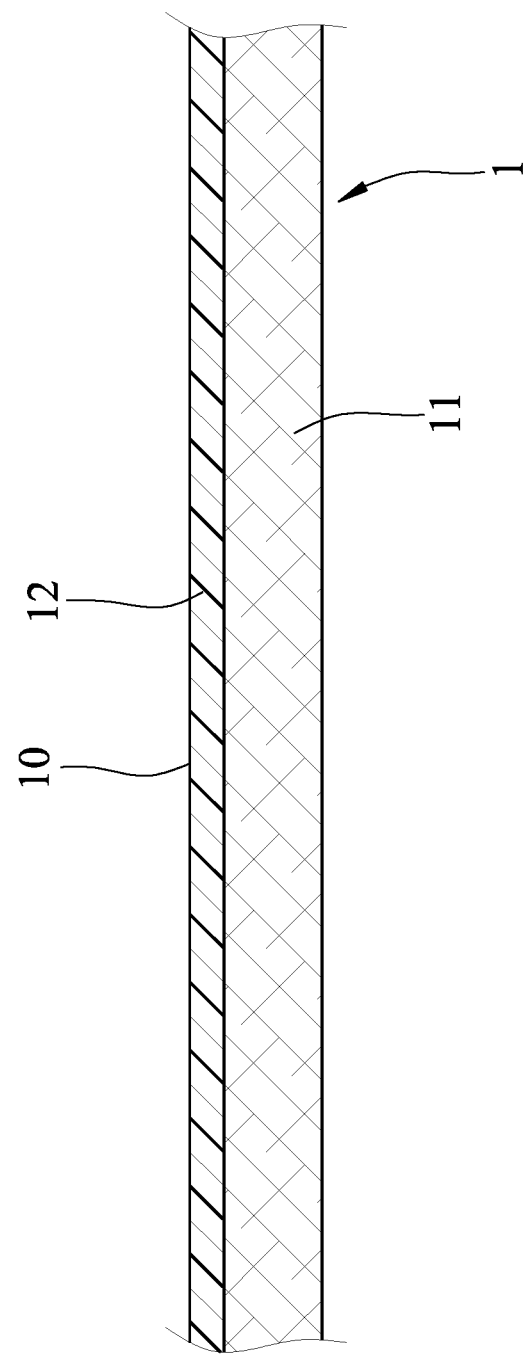
FIG. 10 is a fragmentary cross-sectional view illustrating the structure of a non-stretchable and releasable substrate web used in the embodiment.

As shown in FIG. 10, the non-stretchable and releasable substrate web 1 has a releasing surface 10, and includes a non-stretchable cloth 11 and a releasing layer 12 coated on the non-stretchable cloth 11.

Figure 11:
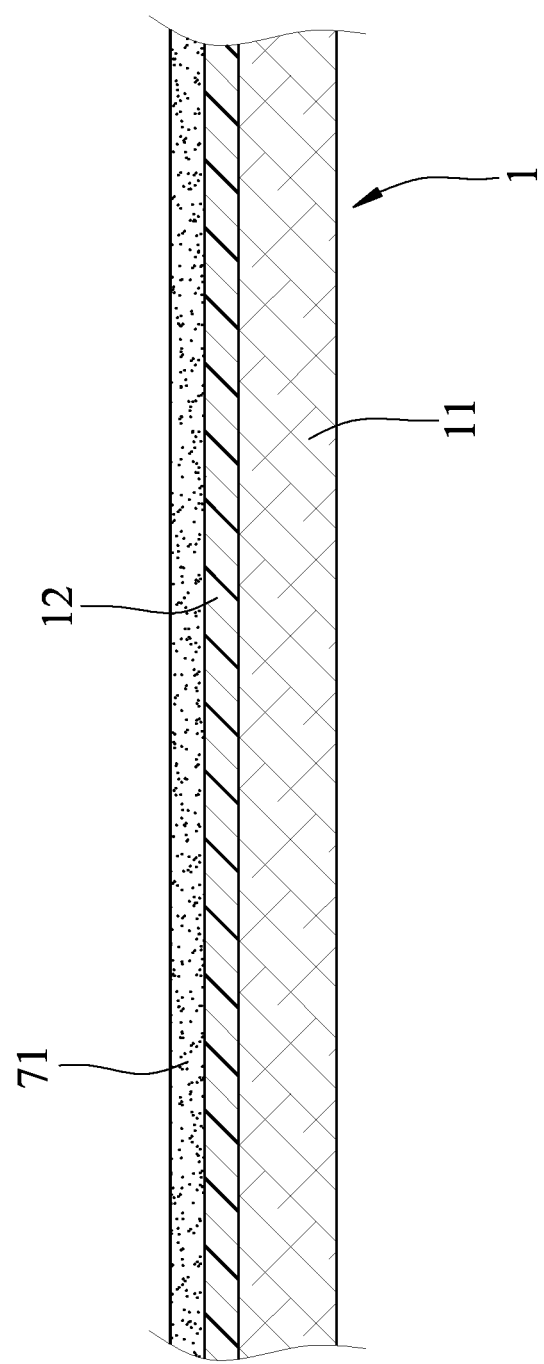
FIG. 11 is a fragmentary cross-sectional view illustrating the non-stretchable and releasable substrate web with a coating layer after a coating step of the embodiment.

As shown in FIG. 11, the coating layer 71 is formed on the releasing layer 12 of the roller-conveyed non-stretchable and releasable substrate web 1.

Figure 12:
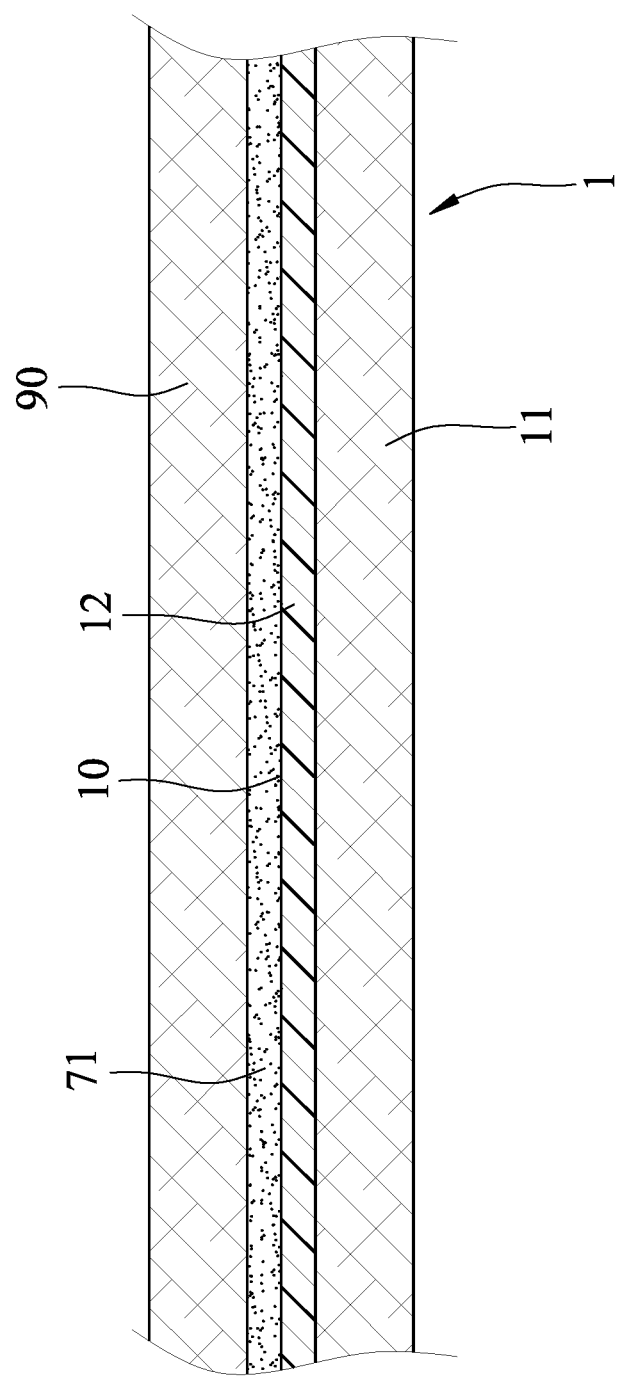
FIG. 12 is a fragmentary cross-sectional view of a laminate structure formed after a laminating step of the embodiment.

(II) Laminating:

With further reference to FIG. 6, a roller-conveyed base fabric 90 is laminated to the coating layer 71 on the roller-conveyed non-stretchable and releasable substrate web 1 at a laminating station (B) downstream of the coating station (A) to form a laminate, as best shown in FIG. 12. As shown, the releasing layer 12 of the roller-conveyed non-stretchable and releasable substrate web 1 is bonded to the roller-conveyed base fabric 90, and the roller-conveyed base fabric 90 overlies the coating layer 71 on the roller-conveyed non-stretchable and releasable substrate web 1. The base fabric 90 used in the embodiment is a knitted fabric, but is not limited thereto. For example, the base fabric 90 may be a woven fabric.

Figure 13:
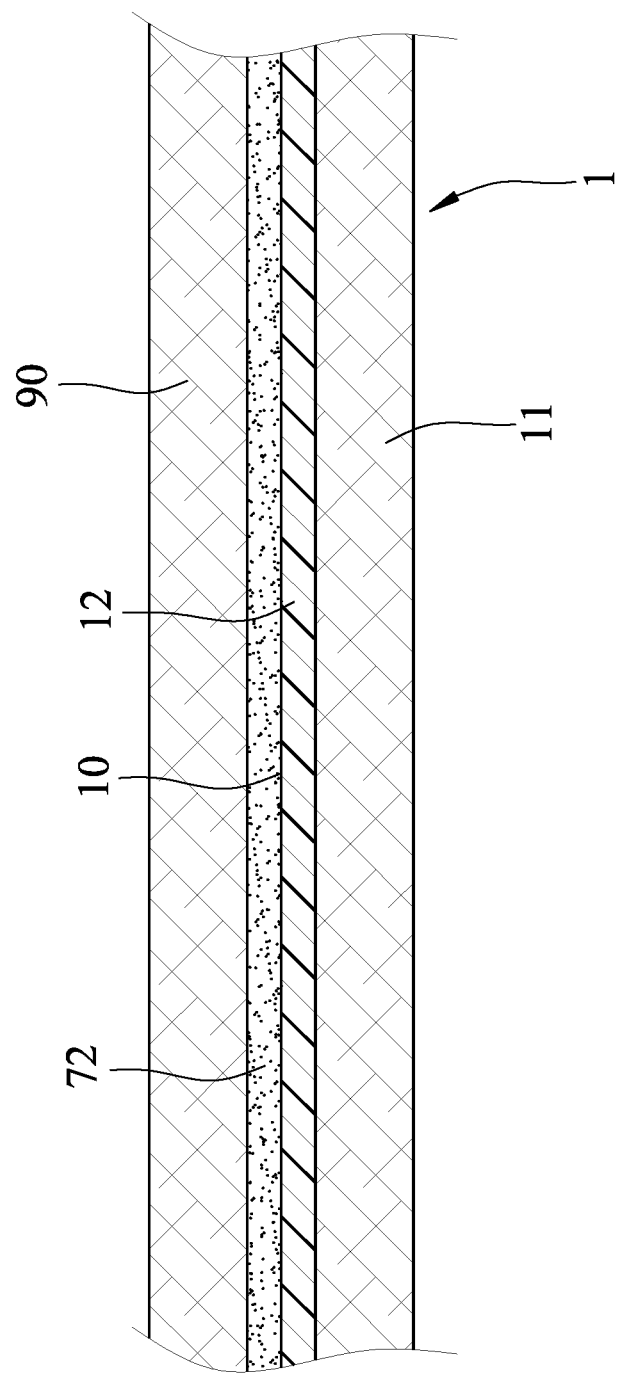
FIG. 13 is a fragmentary cross-sectional view of the laminate structure after an immersing step of the embodiment.

(III) Immersing:

The laminate is then solidified using a wet-solidifying procedure. Specifically, referring to FIG. 7, the laminate is guided along the running route to pass through three tanks 21, each of which contains water, at an immersing station (C) downstream of the laminating station (B) to be immersed in water such that the coating layer 71 is solidified to form a solidified coating layer 72, and the organic solvent contained in the coating layer 71 is replaced by water. The laminate structure the immersing step of the embodiment is shown in FIG. 13.

At the immersing station (C), the tanks 21 are continuously replenished with water such that the organic solvent is continuously carried away by water out of the tanks 21. The water in the tanks 21 is soft water and has a temperature ranging from 25 to 50° C. In an embodiment, the temperature of the water in the tanks 21 is 40° C. The number of the tanks 21 in the illustrated embodiment is three, but is not limited thereto.

Figure 7:
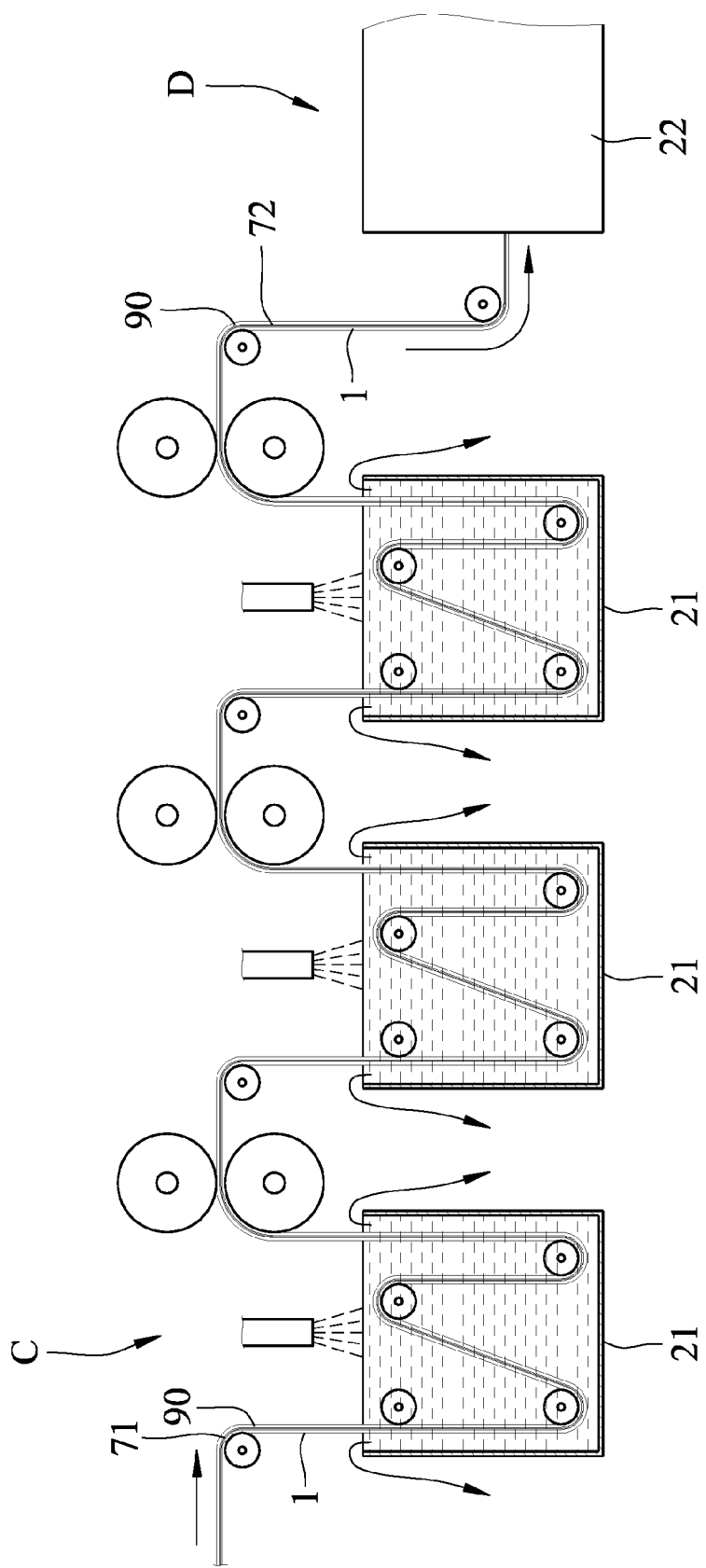
Figure 8:
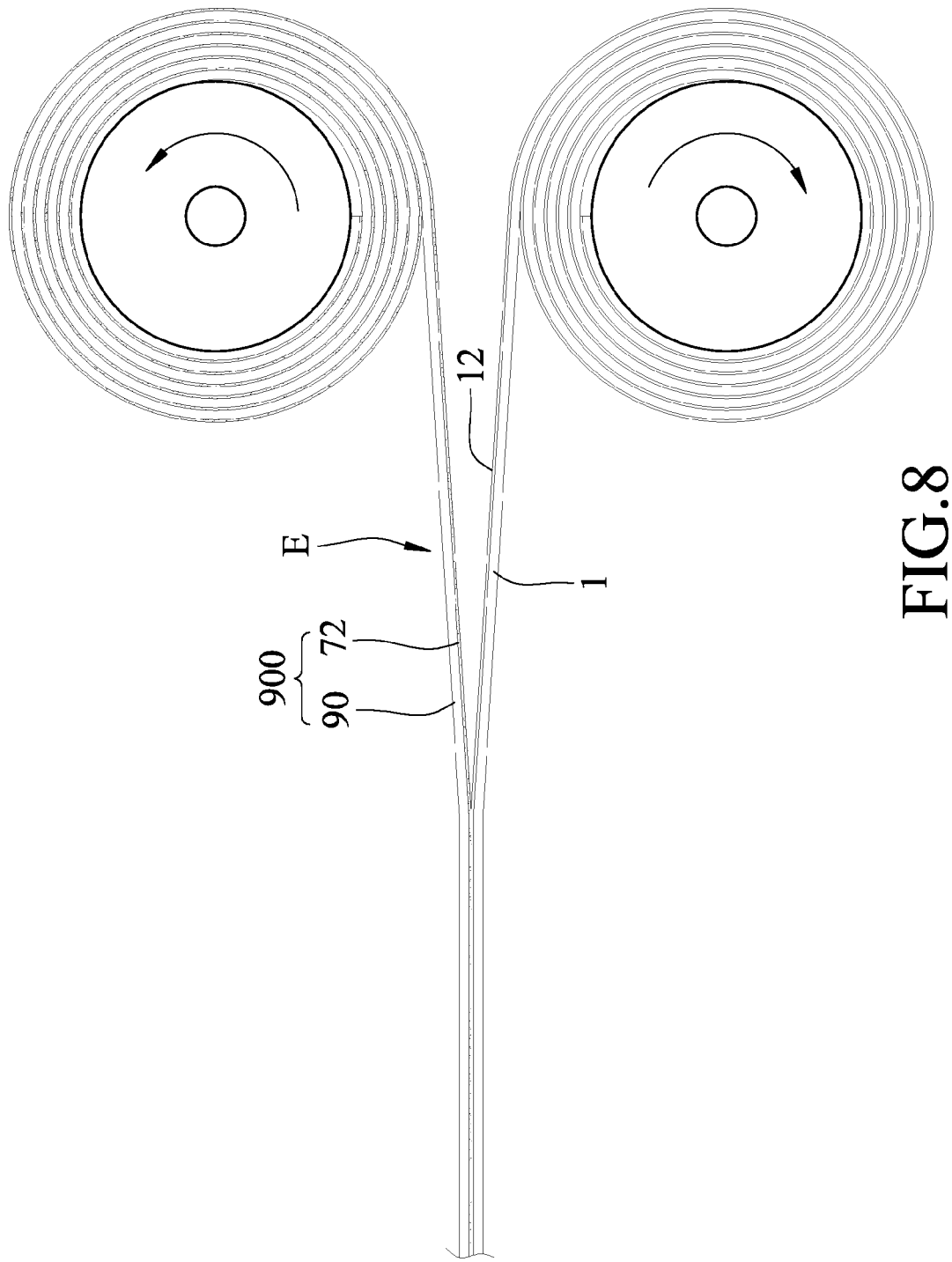

(IV) Drying:

Referring to FIGS. 7 and 8, the laminate coming out of the tanks 21 is guided to a drying station (D) downstream of the immersing station (C) to remove water from the solidified coating layer 72 by drying so as to leave micropores in the solidified coating layer 72, thereby obtaining a functional fabric 900. The functional fabric 900 includes the base fabric 90 and the solidified coating layer 72 as a functional film. The adhesion force between the base fabric 90 and the solidified coating layer 72 is larger than that between the solidified coating layer 72 and the releasing layer 12 of the non-stretchable and releasable substrate web 1. In the embodiment, the solidified coating layer 72 formed on the base fabric 90 ranges from 20 to 50 μm.

(V) Releasing:

Specifically referring to FIG. 8, the roller-conveyed non-stretchable and releasable substrate web 1 is released from the solidified coating layer 72 of the functional fabric 900 at a releasing station (E) downstream of the drying station (D) such that the functional fabric 900 and the non-stretchable and releasable substrate web 1 can be respectively wound into rolls. The functional fabric 900 thus obtained may be made into clothing articles, while the non-stretchable and releasable substrate web 1 may be reused for application of the coating solution 7 thereto in the coating step (I).

Figure 9:
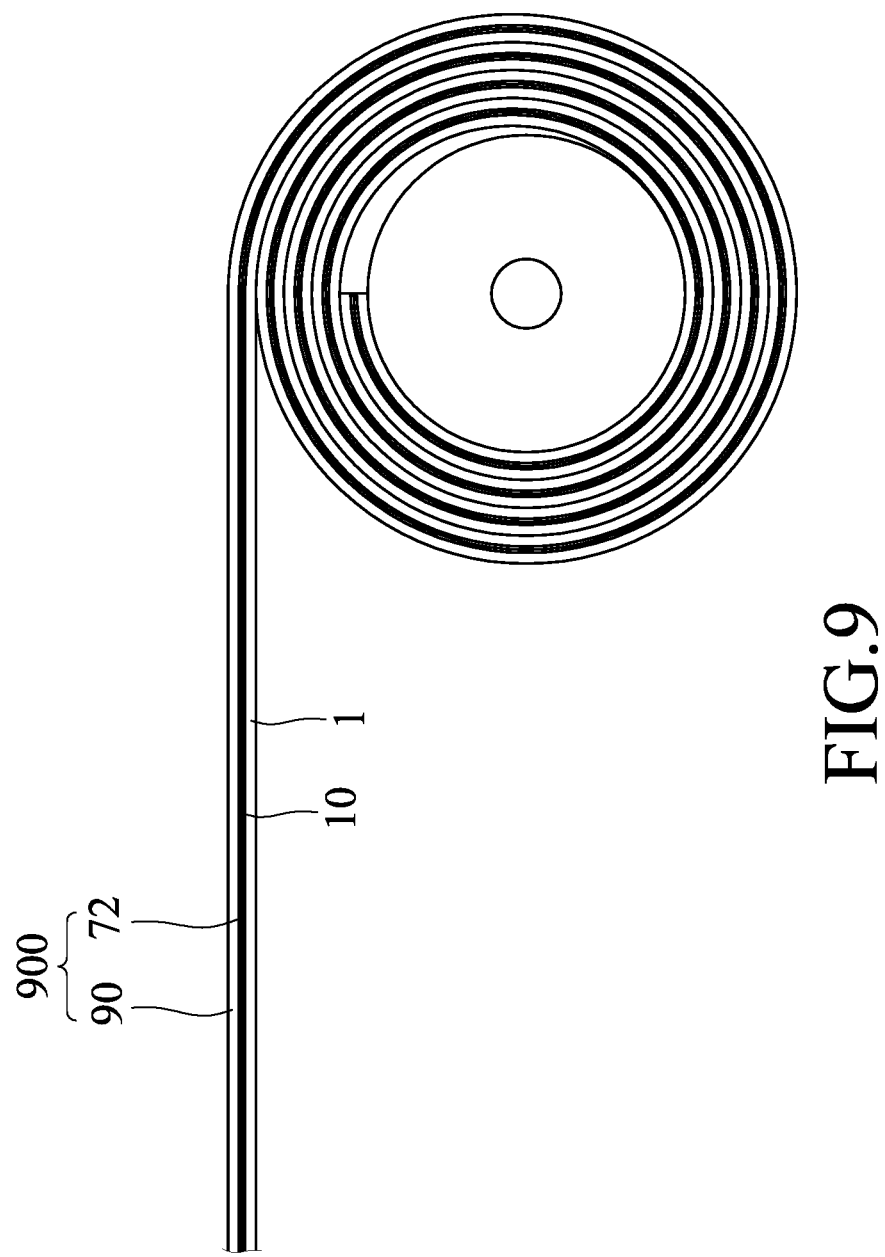

Alternatively, referring to FIG. 9, the functional fabric 900 together with the non-stretchable and releasable substrate web 1 may be wound into a roll for storage such that the non-stretchable and releasable substrate web 1 may be used as a protective layer to prevent the functional fabric 900 from being damaged.

As described above, the non-stretchable and releasable substrate web 1 includes the non-stretchable cloth 11 and the releasing layer 12 coated on the non-stretchable cloth 11. The term "non-stretchable" used for the non-stretchable and releasable substrate web 1 and the non-stretchable cloth 11 is intended to mean that the tensile strength of the non-stretchable and releasable substrate web 1 and specifically the non-stretchable cloth 11 is larger than that of the base fabric 90. In the embodiment, the non-stretchable cloth 11 is a woven fabric, but is not limited thereto. Since the non-stretchable cloth 11 has a tensile strength larger than that of the base fabric 90, the coating layer 71 formed on the roller-conveyed non-stretchable and releasable substrate web 1 and the solidified coating layer 72 formed thereby on the base fabric 90 may have a uniform thickness.

In the embodiment, the non-stretchable and releasable substrate web 1 is made from a material having high water permeability such that water permeate the non-stretchable and releasable substrate web 1 to replace the organic solvent contained in the coating layer 72. Specifically, the releasing layer 12 of the non-stretchable and releasable substrate web 1 is water permeable.

It should be noted that the coating solution 7 may further include at least one additive selected from the group consisting of a pigment, a cross-linking agent, a catalyst, an antioxidant, an ultraviolet absorbing agent, a surfactant, a waterproofing agent, and an antibacterial agent.

Figure 1:
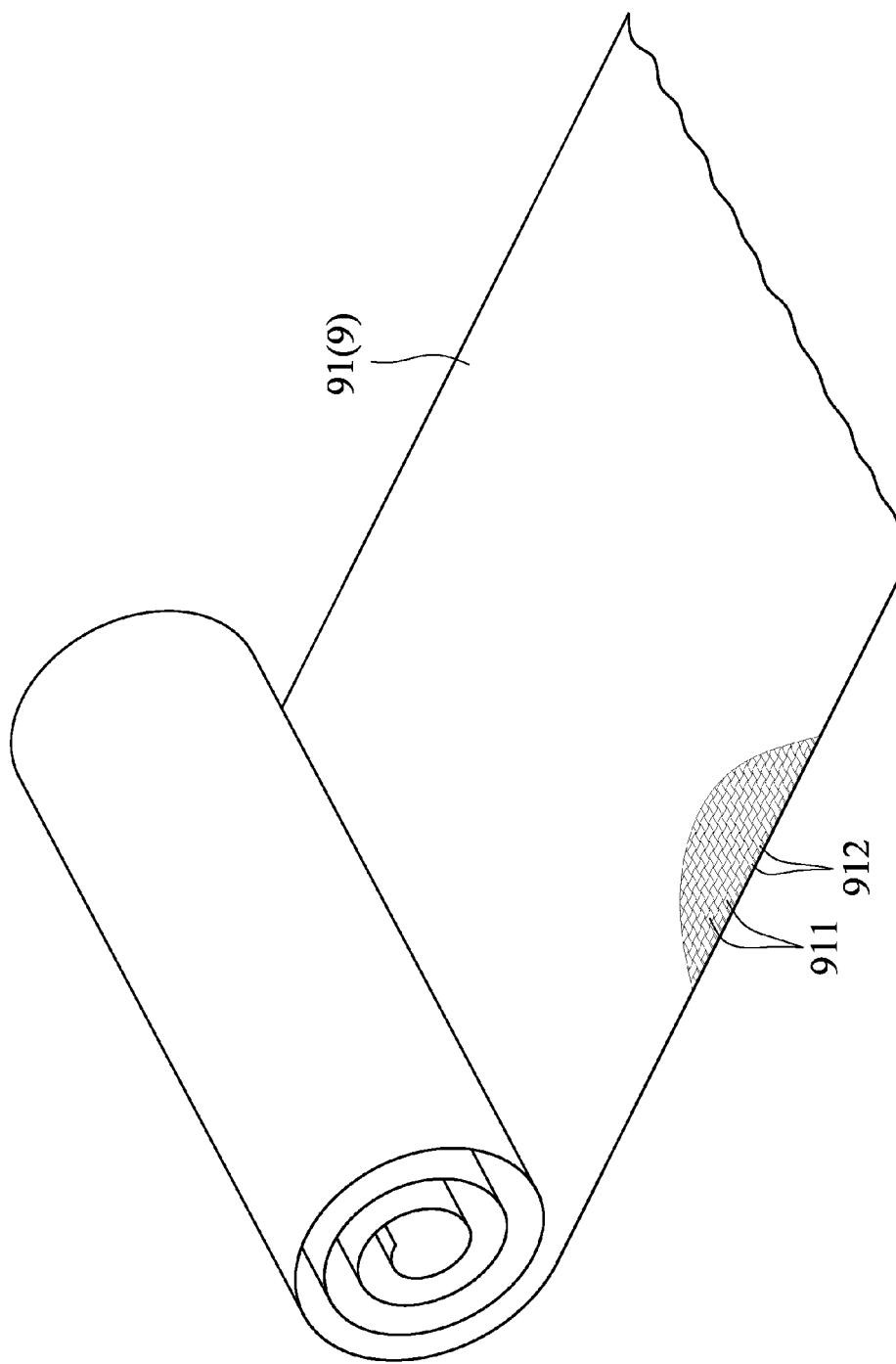
FIG. 1 is a schematic view illustrating the structure of a woven fabric.
Figure 2:
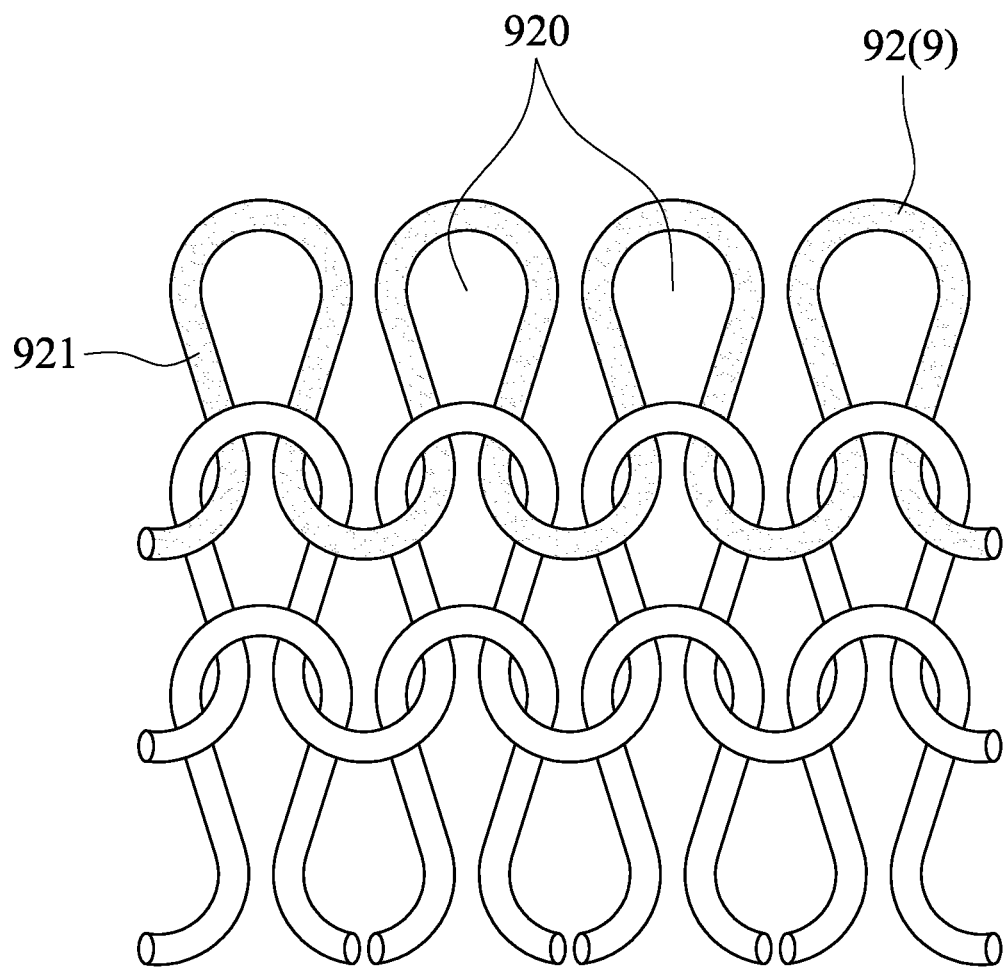
FIG. 2 is a schematic view illustrating the structure of a knitted fabric.
Figure 3:
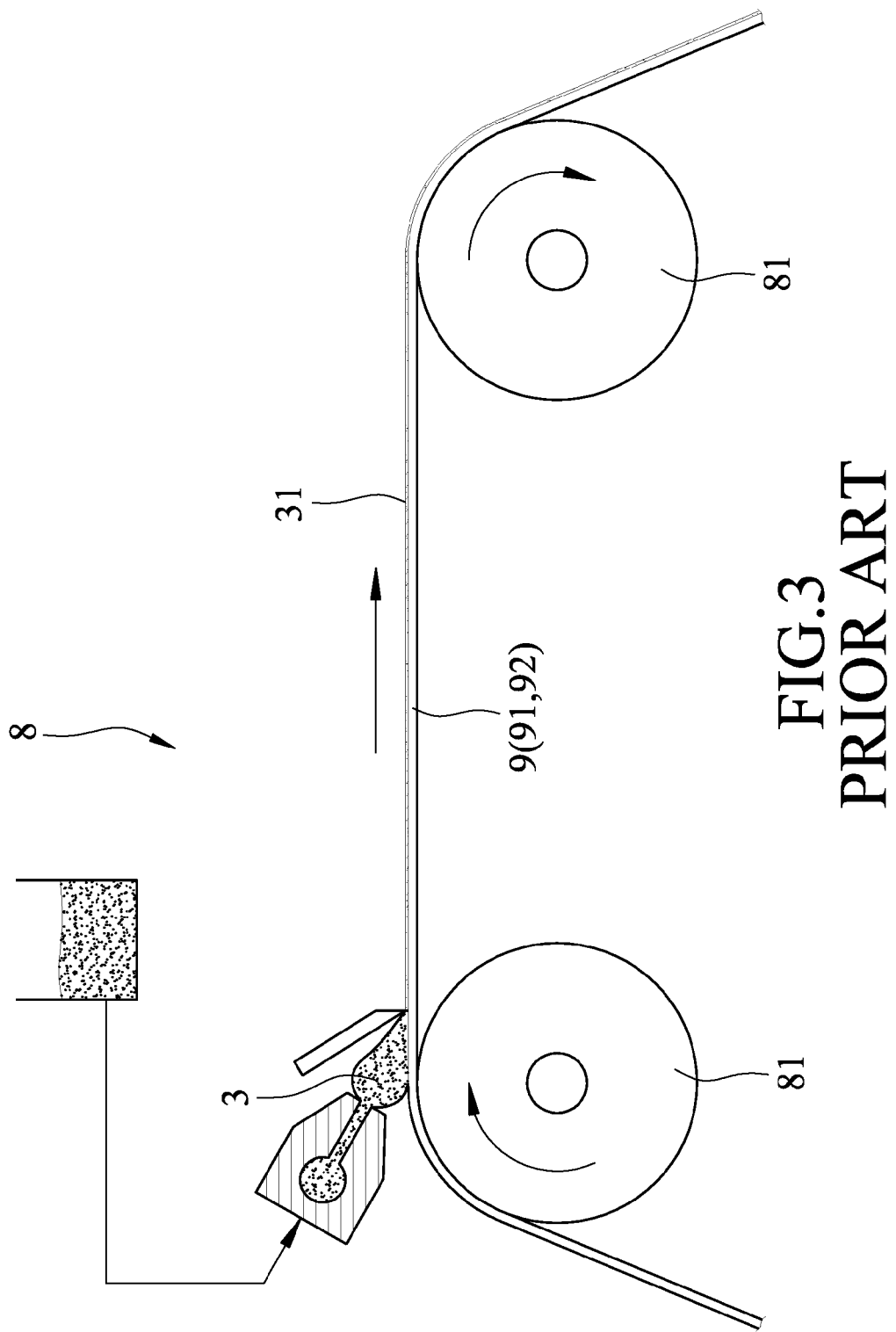
FIG. 3 is a schematic view illustrating the application of a coating material to the woven fabric using a roller coating machine.
Figure 4:
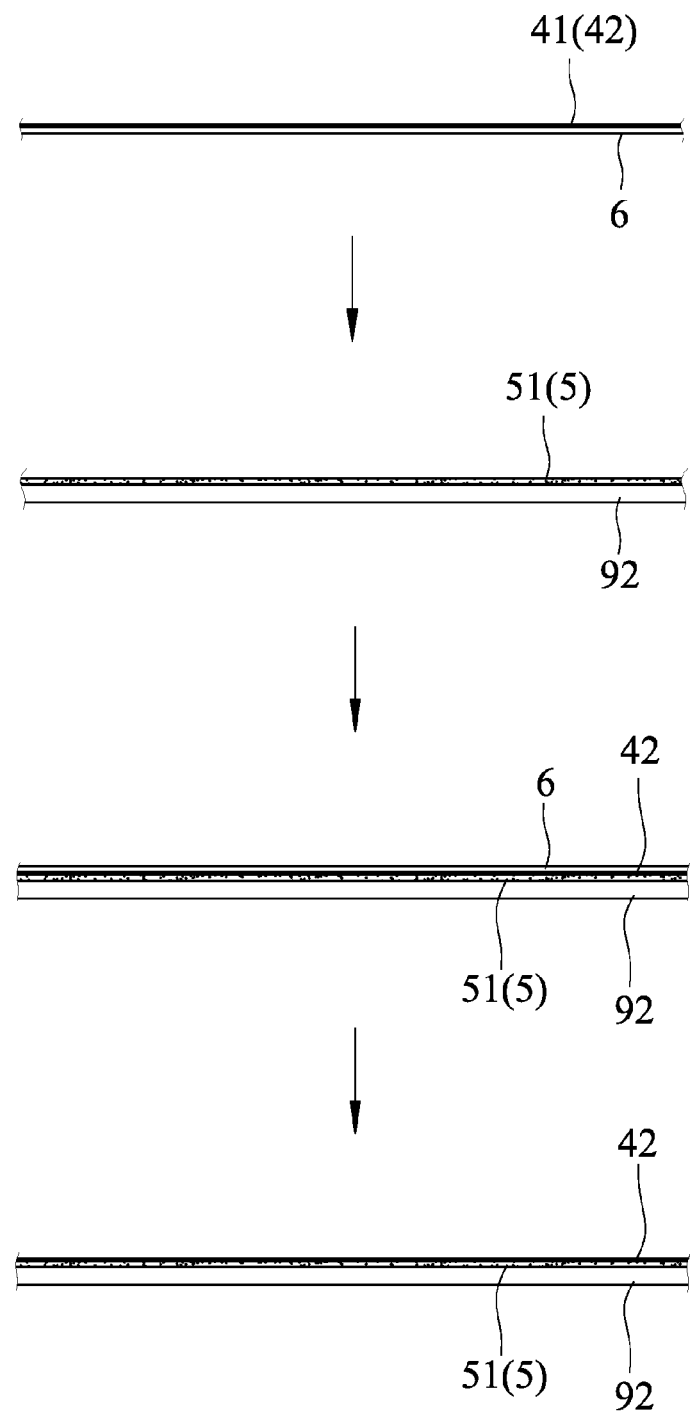
FIG. 4 is a schematic view illustrating a conventional method for forming a coating layer on the knitted fabric.

In view of the aforesaid, since the non-stretchable cloth 11 has a tensile strength larger than that of the base fabric 90, the coating layer 71 formed on the roller-conveyed non-stretchable and releasable substrate web 1 and the solidified coating layer 72 formed thereby on the base fabric 90 may have a uniform thickness, and may not be deformed. In addition, with the use of the non-stretchable cloth 11, rather than a releasing paper as in the conventional method illustrated in FIG. 4, the problems associated with the conventional method of FIG. 4 can be avoided. Moreover, the method for making a coated fabric of the disclosure is relatively simplified.

In the description above, for the purposes of explanation, numerous specific details have been set forth in order to provide a thorough understanding of the embodiment(s). It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for making a coated fabric, comprising the steps of:
    applying a coating solution of a resin in an organic solvent on a non-stretchable and releasable substrate web at a coating station of a running route to form a coating layer on the non-stretchable and releasable substrate web;
    laminating a base fabric to the coating layer on the non-stretchable and releasable substrate web at a laminating station downstream of the coating station to form a laminate, in which the base fabric overlies the coating layer on the non-stretchable and releasable substrate web;
    guiding the laminate along the running route to pass through at least one tank containing water at an immersing station downstream of the laminating station to immerse the laminate in water such that the coating layer is solidified and the organic solvent contained in the coating layer is replaced by water; and
    guiding the laminate coming out of the tank to a drying station downstream of the immersing station to remove water from the coating layer by drying so as to leave micropores in the coating layer.

2. The method according to claim 1, wherein, at the immersing station, the tank is continuously replenished with water such that the organic solvent is continuously carried away by water out of the tank.

3. The method according to claim 1, further comprising a step of releasing the non-stretchable and releasable substrate web from the coating layer at a releasing station downstream of the drying station.

4. The method according to claim 1, wherein the non-stretchable and releasable substrate web is made from a material having high water permeability such that water permeates the non-stretchable and releasable substrate web to replace the organic solvent contained in the coating layer.

5. The method according to claim 1, wherein the non-stretchable and releasable substrate web includes a non-stretchable cloth and a releasing layer that is coated on the non-stretchable cloth and that is bonded to the base fabric at the laminating station.

6. The method according to claim 5, wherein the non-stretchable cloth is a woven fabric.

7. The method according to claim 5, wherein the releasing layer is water permeable.

8. The method according to claim 1, wherein the resin contained in the coating solution is selected from the group consisting of a polytetrafluoroethylene resin, a polyethylene resin, a polyurethane resin, and combinations thereof.

9. The method according to claim 8, wherein the coating solution further includes at least one additive selected from the group consisting of a pigment, a cross-linking agent, a catalyst, an antioxidant, an ultraviolet absorbing agent, a surfactant, a waterproofing agent, and an antibacterial agent.

10. The method according to claim 1, wherein the base fabric is a knitted fabric.

11. The method according to claim 1, wherein the water in the tank has a temperature ranging from 25 to 50° C.

* * * * *